United States Patent [19]

Yamasaki

[11] Patent Number: 5,481,330
[45] Date of Patent: Jan. 2, 1996

[54] PANORAMIC PHOTOGRAPH PROCESSING SYSTEM

[75] Inventor: Masafumi Yamasaki, Tokyo, Japan

[73] Assignee: Olympus Optical Co., Ltd., Tokyo, Japan

[21] Appl. No.: 206,796

[22] Filed: Mar. 7, 1994

[30] Foreign Application Priority Data

Mar. 8, 1993 [JP] Japan .................................. 5-046377

[51] Int. Cl.⁶ .......................... G03B 17/24; G03B 27/52; H04N 1/21; H04N 1/387
[52] U.S. Cl. ..................... 354/412; 354/94; 354/106; 355/41; 358/450; 358/302
[58] Field of Search ........................... 354/94, 410, 412, 354/159, 105, 106; 355/40, 41, 35, 36, 38; 358/302, 450

[56] References Cited

U.S. PATENT DOCUMENTS

| | | | |
|---|---|---|---|
| 4,589,754 | 5/1986 | Maitani et al. | 354/431 |
| 4,589,755 | 5/1986 | Maitani et al. | 354/431 |
| 4,589,757 | 5/1986 | Maitani et al. | 354/458 |
| 4,618,238 | 10/1986 | Maitani et al. | 354/431 |
| 5,003,340 | 3/1991 | Harvey | 354/106 X |
| 5,060,006 | 10/1991 | Taniguchi et al. | 354/106 X |
| 5,086,310 | 2/1992 | Iwashita et al. | 354/106 X |
| 5,095,324 | 3/1992 | Alytuku et al. | 354/106 |
| 5,138,460 | 8/1992 | Egawa | 354/94 X |
| 5,151,726 | 9/1992 | Iwashita et al. | 354/106 X |
| 5,262,867 | 11/1993 | Kojima | 354/105 X |
| 5,305,051 | 4/1994 | Irie et al. | 354/159 X |

FOREIGN PATENT DOCUMENTS

3-14639  2/1991  Japan .

*Primary Examiner*—W. B. Perkey
*Attorney, Agent, or Firm*—Frishauf, Holtz, Goodman, Langer & Chick

[57] ABSTRACT

The present invention is a panoramic photograph processing system which will provide a non-peculiar panoramic photograph with continuous color and brightness between consecutive photographs by setting the same exposure condition for panorama-mode frames of a film and performing printing of the panorama-mode frames under the same exposure condition. An output from a photometric sensor is amplified by an amplifier and is then converted to a digital signal by an A/D converter. The digital signal is supplied to a central processing unit (CPU). The digital photometric data from the A/D converter is input to the CPU together with various pieces of photograph information from a photograph information input circuit. A liquid crystal for displaying a shutter speed and a panorama-mode in a finder and a liquid crystal for displaying a latent image bar code data indicating the start position of a panorama-mode are controlled by the CPU via liquid crystal drivers. A bar code pattern formed by the latter liquid crystal via the associated liquid crystal driver is irradiated by a light source to be recorded as latent image data on the film.

38 Claims, 5 Drawing Sheets

PANORAMIC PHOTOGRAPH PROCESSING SYSTEM

BACKGROUND OF THE INVENTION

1. Field of the Invention

The present invention relates to a panoramic photograph processing system, and more particularly, to a panoramic photograph processing system which synthesizes a panoramic photograph with highly accurate positioning between consecutive photographs in the panoramic photograph and with an excellent density and color balance.

2. Description of the Related Art

In providing a panoramic photograph of a distant view, conventionally, a photographer should perform manual consecutive photographing of the distant view or should use a camera having a panorama mode.

In the former case, the photographer should take pictures consecutively while changing the angle of the scene slightly for each shot so that the resultant photographs would appear as a single photograph.

With regard to the latter case, for example, Jpn. UM Applnh. KOKAI Publication No. 3-14639 discloses a camera technology which can provide a continuous panoramic photograph without causing a photographer to pay much attention to the linkage between the edges of photographed scenes or the angles of the scenes.

In the case of the aforementioned panoramic photographing, however, the exposure is automatically controlled in panorama mode, so that exposure conditions may differ between consecutive frames. This is apt to cause a discontinuous density color balance, which would result in a peculiar or inadequate panoramic photograph. Even if manual exposure control is performed to provide the same exposure condition of the camera, the exposure condition would not always be constant by negative inspection in a printing equipment so that a discontinuous panoramic photograph may be obtained.

SUMMARY OF THE INVENTION

It is therefore an object of the present invention to provide a panoramic photograph processing system which will provide a non-peculiar panoramic photograph with continuous color and brightness between consecutive photographs.

To achieve this object, according to one aspect of this invention, there is provided a camera capable of taking a panoramic photograph, comprising a photometer for measuring a brightness of an object to be photographed; a film sensitivity input device for inputting film sensitivity information of a photographic film; an exposure control device for controlling an amount of exposure to the film; a panorama-mode switch for selecting a panorama-mode for rolling consecutive frames under a same exposure condition; an information recording device for recording information on the film; and a microcomputer, connected to the photometer, the film sensitivity input device, the panorama-mode switch and the information recording device, for calculating an exposure control value based on the brightness of the object measured by the photometer and the film sensitivity information input by the film sensitivity input device, controlling the exposure control device based on the exposure control value, and, with the panorama-mode selected by the panorama-mode switch, controlling the exposure control device so as to take consecutive photographs from a point of setting the panorama-mode to a point of releasing the panorama-mode under same exposure and causing the information recording device to record setting of the panorama-mode on the film, whereby information of the panorama-mode is indicated to an external printing equipment.

According to another aspect of this invention, there is provided a camera capable of taking a panoramic photograph, comprising panorama-mode setting means for setting a panorama-mode; exposure control means for executing exposure control on consecutive frames of a photographic film with a same amount of exposure in the panorama-mode; and an information recording device for recording setting of the panorama-mode on the photographic film, whereby information of the panorama-mode is indicated to an external printing equipment.

According to a different aspect of this invention, there is provided a printing equipment for printing images recorded on a developed film having panoramic information recorded thereon based on the developed film, comprising printing means for printing the images recorded on the developed film; setting means for setting a printing condition for the printing means an information reading device for reading panoramic information recorded on a part of the developed film; and control means for causing the printing means to print under a same printing condition for frames that are determined to have been rolled in panorama-mode based on the panoramic information read by the information reading device.

According to a further aspect of this invention, there is provided a panoramic photograph system for connecting a plurality of frames to obtain a panoramic photograph, comprising a camera including means for performing control in such a way as to ensure a constant amount of exposure for individual frames in a sequence of panoramic photographing operations, and means for recording codes indicating at least first and last frames of consecutive panorama-mode frames; and a printing equipment including means for detecting the codes recorded on a developed film; and means for identifying the consecutive panorama-mode frames based on the codes and executing a printing operation for the panoramic photograph in such a way that printing of the consecutive panorama-mode frames is conducted under a same condition.

According to a still further aspect of this invention, there is provided a camera for taking a panoramic photograph, comprising exposure means for exposing a film to record an image of an object thereon; indicating means for indicating start and end of a sequence of panoramic photographing operations; control means for controlling the exposure means in such a manner as to ensure a same exposure condition for individual frames during the sequence of panoramic photographing operations; and recording means for recording information to allow at least first and last frames in the sequence of panoramic photographing operations to be identified, on the film.

According to a yet still further aspect of this invention, there is provided a printing equipment for producing a panoramic photograph, comprising means for detecting consecutive panorama-mode frames from among a plurality of frames of a developed film by reading identification codes recorded by a recording device of a camera at a time of taking a panoramic photograph and determining first and last panorama-mode frames; and means for subjecting the consecutive panorama-mode frames to printing under a same condition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Preferred embodiments of the present invention will be described below with reference to the accompanying drawings.

Figure 1:
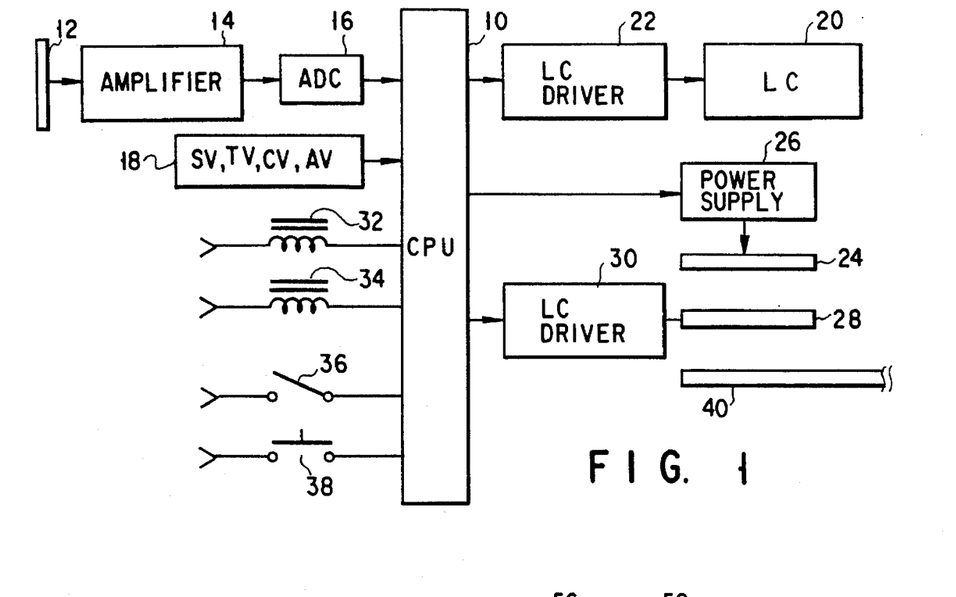
FIG. 1 is a diagram showing the basic structure of a camera to which a panoramic photograph processing system according to one embodiment of the present invention is adapted.

FIG. 1 is a diagram showing the basic structure of a camera to which a panoramic photograph processing system according to one embodiment of the present invention is adapted. In FIG. 1, a central processing unit (CPU) 10 performs the general control of the camera and performs various arithmetic operations. The output of a photometric sensor 12, which senses the brightness of a view to be photographed to execute exposure control, is amplified by an amplifier 14. The amplified signal is converted to a digital signal by an A/D converter 16, and this digital signal is supplied to the CPU 10.

Connected to the CPU 10 are a photograph information input circuit 18, a liquid crystal (LC) driver 22 for driving a liquid crystal 20, a power supply 26 for a light source 24, an LC driver 30 for driving a liquid crystal 28, a front curtain stopping magnet 32, a rear curtain stopping magnet 34, a panorama-mode switch 36 and a release switch 38. Reference numeral "40" denotes a film.

Photometric or brightness data (hereinafter referred to as "BV value") which has undergone A/D conversion in the A/D converter is subjected to an apex computation in the CPU 10 based on aperture information (AV value) of the pickup lens, film speed or film sensitivity information (SV value) and exposure compensation information (CV value), yielding exposure time or shutter speed information (TV value). The photograph information input circuit 18 serves to input those pieces of information.

The liquid crystal 20 is for displaying a panorama-mode (to be described later) in a finder. The liquid crystal 28 is to display latent image bar code data representing a panorama-mode start position, on a film 40. The LC drivers 22 and 30 are both controlled by the CPU 10.

The bar code pattern formed by the liquid crystal 28 via the LC driver 30 is irradiated by the light source 24 to be recorded as latent image data on the film 40. The power supply 26 is controlled by the CPU 10.

Figure 2:
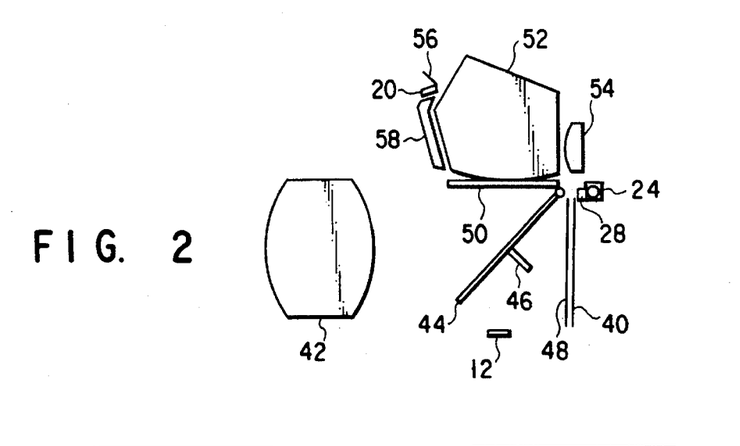
FIG. 2 is a diagram showing the arrangement of essential portions of the camera.

FIG. 2 is a diagram showing the arrangement of essential portions of the camera, and uses the same reference numerals as used in FIG. 1 to specify identical components. In FIG. 2, a photographing lens 42 and a main movable mirror 44 rotate with a release action to move away from the photographing light path. Light hitting on the center portion of the main movable mirror 44 partially passes through and is reflected downward by an auxiliary mirror 46 to be led to the photometric sensor 12. When the main movable mirror 44 is moved away from the photographing light path, object light is led to a shutter 48 and the film 40.

Object light that does not pass through the main movable mirror 44 and is reflected upward by the mirror 44 is guided to a mat 50. The object light passing through the mat 50 is guided to an eye of a photographer via a pentagonal prism 52 and an eyepiece 54.

Figure 3A:
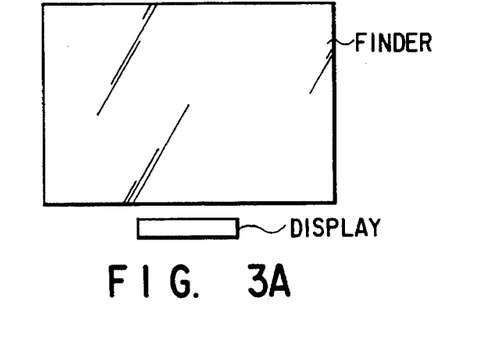
FIGS. 3A is a diagram showing the layout of a finder and a liquid crystal display.

A mirror 56 serves to guide outside light to the liquid crystal 20. A light guiding optical system 58 serves to display what is indicated by the liquid crystal 20 to a lower finder portion shown in FIG. 3A, and comprises a plurality of mirrors.

Figure 4:
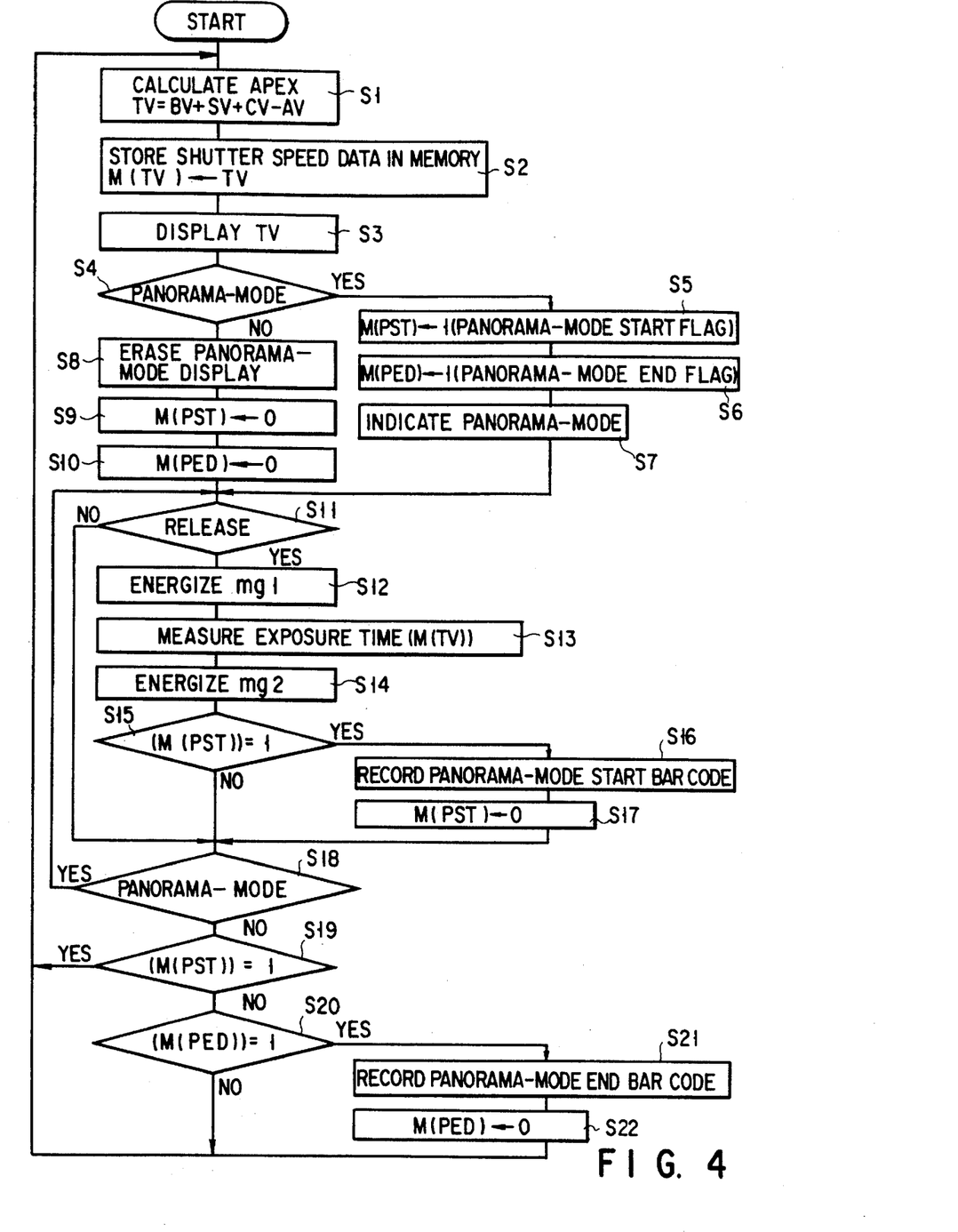
FIG. 4 is a flowchart for explaining the operation of the camera of the first embodiment.

The operation of this camera will now be described referring to a flowchart given in FIG. 4.

Based on the brightness BV of an object sensed by the photometric sensor 12 and the film sensitivity SV, exposure compensation value CV and aperture value AV input from the photograph information input circuit 18, the shutter speed TV (TV=BV+SV+CV−AV) is computed by an apex computation (step S1). Then, the shutter speed TV obtained in step S1 is stored in a memory M (TV) (step S2).

Figure 3B:
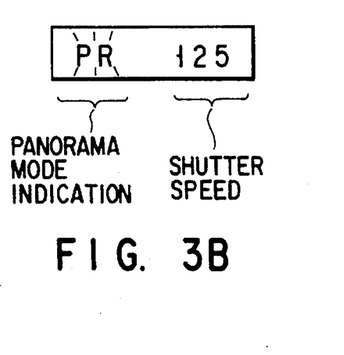
FIG. 3B is a diagram showing an example of what is displayed on the liquid crystal display.

The shutter speed TV is displayed in the finder as shown in FIG. 3B (step S3). Based on the finder display, it is determined whether or not the mode is a panorama-mode (step S4).

If the mode is the panorama-mode, "1" is stored in a memory M (PST) to set a panorama-mode start flag (step S5). Then, "1" is stored in a memory M (PED) to set a panorama-mode end flag (step S6). It is assumed that when the CPU 10 is activated, "0" is stored in the memories M (PST) and M (PED). As shown in FIG. 3B, a panorama-mode indication "PR" is displayed in a blinking manner in the finder (step S7).

When the mode is not the panorama-mode in the aforementioned step S4, the panorama-mode indication is erased (step S8). Then, "0" is stored in the panorama-mode start flag memory M (PST) and panorama-mode end flag memory M (PED) (steps S9 and S10).

Next, it is determined whether or not a release action has been taken (step S11). Assuming that the release switch 38 has been depressed to cause the release action, then the magnet 32 is energized to start the front curtain piece (step S12). Based on the content of the memory M (TV) where the shutter speed information TV is stored, the exposure time is measured (step S13). When predetermined exposure is complete, the magnet 34 is energized to start the rear curtain piece, terminating the exposure (step S14).

Figure 5:
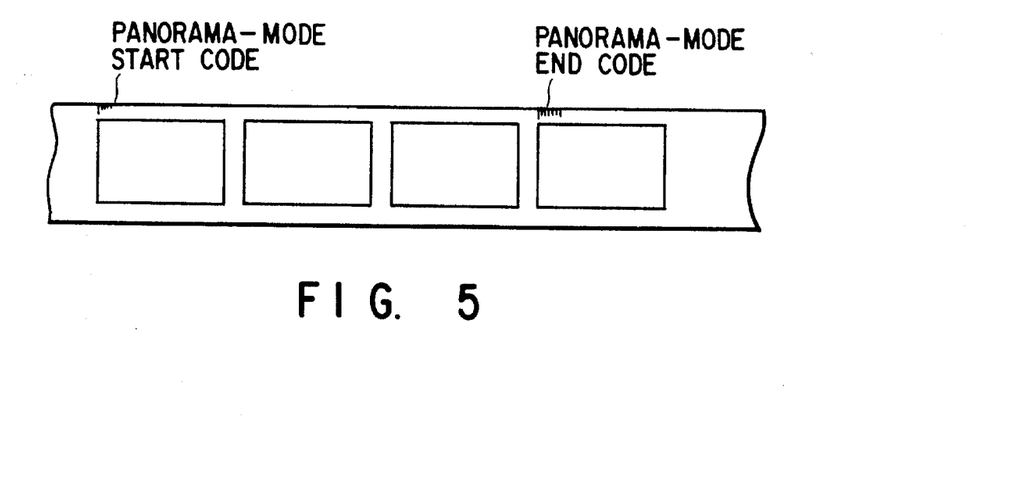
FIG. 5 is a diagram showing a panorama-mode start bar code recorded on a film.

It is then determined whether or not the content of the panorama-mode start flag memory M (PST) is "1," i.e., whether or not the panorama-mode has started (step S15). When (M (PST))=1, it is determined that the mode is the panorama-mode. Then, a bar code indicating the start of the panorama-mode is set to the liquid crystal 28, and the light source 24 is activated to record the panorama-mode start bar code on the film 40 (step S16). FIG. 5 shows this panorama-mode start bar code recorded on the film.

Then, the content of the memory M (PST) is set to "0" (step S17). This is because the panorama-mode start bar code is recorded only the first frame after the panorama-mode has started. Then, the status of the panorama-mode switch 36 is determined (step S18). If the panorama-mode switch 36 is closed, it is determined that the mode is the panorama-mode. In this case, the flow returns to step S11 to determine again if a release action has been taken.

If no release action has been taken in step S11, the flow moves to step S18 to determine the panorama-mode. If the release action is detected in step S11, the above-described operation is repeated. In other words, in panorama-mode, the shutter is controlled with the same exposure time (M (TV)) as given to the first frame after the panorama-mode has started.

If the panorama-mode switch 36 is opened to release the panorama-mode, it is determined in step S18 that the mode is not the panorama-mode and it is determined whether or not the content of the panorama-mode start flag M (PST) is "1" (step S19). If (M (PST))=1 in this step S19, the flow returns to step S1 to repeat the above-described loop. If (M (PST)) is not equal to "1" in step S19, it is determined whether or not the content of the panorama-mode end flag M (PED) is "1" (step S20).

When (M (PED))=1, bar code latent image data indicating the end of the panorama-mode is recorded on the film 40 as shown in FIG. 5 (step S21). Then, "0" is set to the memory M (PED) (step S22) before the flow returns to step S1.

Through the above operation, those frames starting at the frame on which the panorama-mode start code is recorded and ending at a frame immediately before the frame on which the panorama-mode end code is recorded become the panorama-mode frames.

Figure 6:
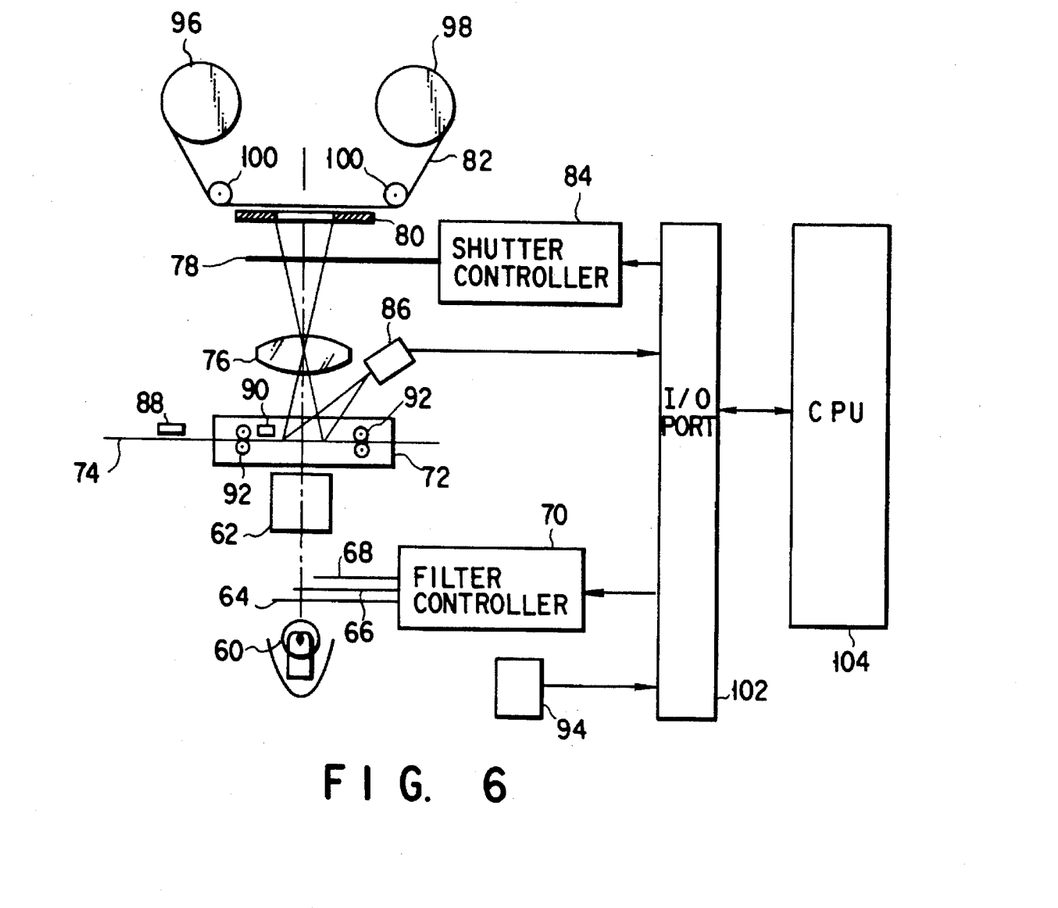
FIG. 6 is a structural diagram of a printing equipment for printing on a photographic paper using a film which has been used in the camera of this embodiment to take pictures and which has been developed.

FIG. 6 is a structural diagram of a printing equipment for printing on a photographic paper using a film which has been used in the camera with the above-described structure to take pictures and which has been developed.

In FIG. 6, a cyan filter 64, a magenta filter 66 and a yellow filter 68 are disposed between a white light source 60 and a diffusion box 62. The cyan filter 64 adjusts the red component of the illumination light, the magenta filter adjusts the green component and the yellow filter 68 adjusts the blue component. The amount of light led to a photographic paper 82 can be adjusted for each color by moving those filters 64, 66 and 68 in a horizontal direction relative to one another.

A filter controller 70 adjusts the amount of shifting of each filter in accordance with the result of an exposure computation to be described later. The light diffused in the diffusion box 62 is led to the photographic paper 82 via a negative film 74, a lens 76, a shutter 78 and a photographic paper mask 80 in a film carrier 72. As a result, an image from the film 74 is formed on the photographic paper 82. The shutter 78 is controlled by a shutter controller 84 in accordance with the exposure computation.

A photometric sensor 86 and a bar code sensor 88 are provided in the vicinity of the film carrier 72. The photometric sensor 86 measures the brightness of a frame targeted for printing, and the bar code sensor 88 detects a bar code on the negative film 74. A notch sensor 90 and a film feeding roller 92 are provided in the film carrier 72.

A developed film is placed in a negative film inspecting machine (not shown) to perform negative film inspection for each frame. For printable frames, semi-circular notches are formed at one side edge of the film. For those frames which will not provide good printouts even through compensation due to poor or inadequate photographing, no notches will be given as well known.

For those frames which need compensation, density compensation data and color compensation data are input to ensure the optimal finishing. Those compensation data, the number of notches and data of an interval between notches are recorded on an LSI card 94.

The photographic paper 82 is fed to a photographic paper take-up reel 98 from a photographic paper feed reel 96 by rollers 100.

The aforementioned individual units are connected via an I/O port 102 to a CPU 104.

Figure 7:
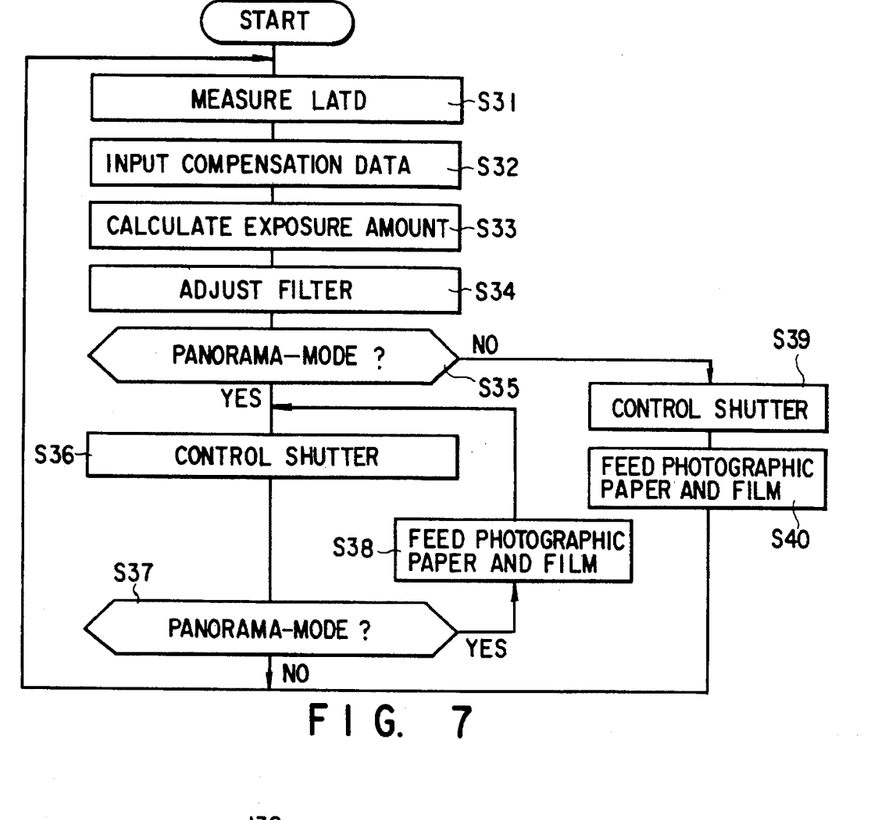
FIG. 7 is a flowchart for explaining the operation of the printing equipment having the structure shown in FIG. 6.

The operation of the thus constituted printing equipment will be described referring to a flowchart given in FIG. 7.

First, the photometric sensor 86 measures a large area transmittance density (LATD) of frames to be printed (step S31). Then, an amount of exposure is computed from the LATD and the compensation data from the LSI card 94 (steps S32 and S33). Based on the computed exposure, the filter controller 70 is controlled to position the individual filters 64 to 68 to proper positions and the intensity of the light of the white light source 60 is adjusted (step S34).

The LATD-based exposure control is a system for controlling the amount of exposure in such a way as to make the red-LATD, the green-LATD and the blue-LATD become nearly equal to one another. The exposure control includes the color balance control mentioned above and density control. The density is controlled by controlling the exposure time under the control of the shutter controller 84.

When the filter adjustment is completed, it is then determined if the panorama-mode start bar code is detected (step S35). If the target frame for printing is determined as a panorama-mode frame, the shutter 78 is controlled based on the exposure time acquired by the aforementioned exposure computation (step S36). Next, it is determined if the panorama-mode end bar code is detected (step S37). If the next target frame is also determined as a panorama-mode frame, the photographic paper 82 and the film 74 are fed by one frame (step S38) and printing is executed again under the same exposure condition.

When the mode is not determined as the panorama mode in step S37, the flow returns to step S31 to repeat the same operation thereafter.

The discrimination on the panorama-mode in step S35 will be carried out as follows. When the frame whose panorama-mode start bar code has been detected by the bar code sensor 88 is fed to the printing position, the mode is determined as the panorama-mode.

The discrimination on the panorama-mode in step S37 will be carried out as follows. When a frame immediately before the frame whose panorama-mode end bar code has been detected by the bar code sensor 88 is fed to the printing position, it is determined that the mode is not the panorama-mode or that it is the end of the panorama-mode.

If the mode is not determined as the panorama-mode in step S35, the shutter 78 is controlled based on the exposure time obtained by the exposure computation (step S39). Then, after the photographic paper 82 and the film 74 are fed by one frame (step S40), the flow returns to step S31 to repeat the above-described operation.

A description will now be given of another embodiment which allows a digital hard copying apparatus to perform printing of a film used in the above-described panorama-mode.

Figure 8:
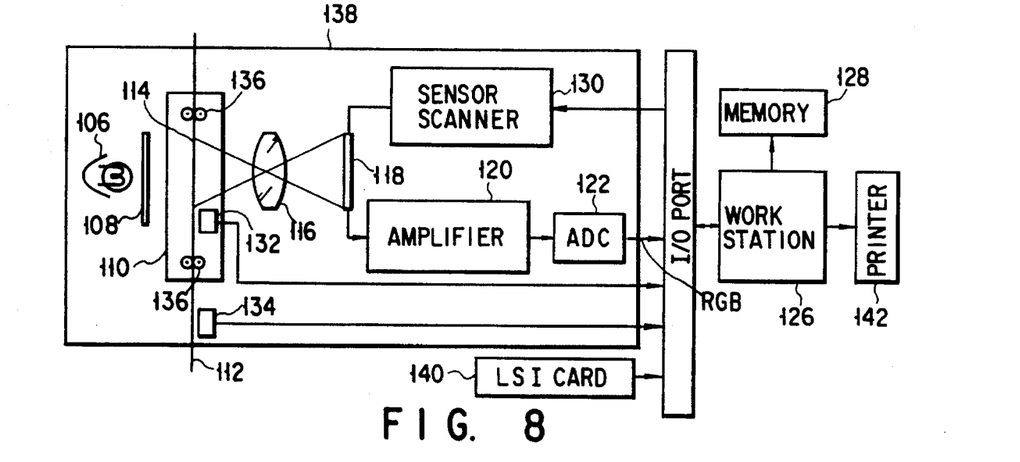
FIG. 8 is a structural diagram of a digital hard copying apparatus according to a second embodiment of this invention.

FIG. 8 is a structural diagram of such a digital hard copying apparatus. In FIG. 8, white light from a light source 106 is guided to a one-dimensional color line sensor 118 through a diffusion plate 108 located near the light source 106, a printing target frame 114 of a film 112 in a film carrier 110 and a lens 116. The image of the printing target frame is formed via the lens 116 onto the color line sensor 118.

The output signal of the color line sensor 118 is supplied via an amplifier 120 to an A/D converter 122 to be converted to a digital signal. The digital signal is stored as image data in a memory 128 via an I/O port 124 under the control of a work station 126.

A sensor scanner 130 scans the color line sensor 118 in a direction perpendicular to the sensor 118 to obtain one frame of image data. A notch sensor 132 and a bar code sensor 134 function in the same way as the notch sensor 90 and bar code sensor 88 in FIG. 6, respectively.

Reference numeral "136" denotes a film feed roller for feeding the film 112.

A scanner 138 is constituted of the aforementioned components.

An LSI card 140 is the same as the LSI card 94 in FIG. 6 and has compensation data, the number of notches and data of an interval between notches recorded thereon.

Based on various types of information obtained from the scanner 138, the work station 126 performs various computations and control operations for the color balance control or density control for printing, which will be discussed later. A printer 142 is designed to provide an optimal printout based on the information computed by the work station 126.

Figure 9:
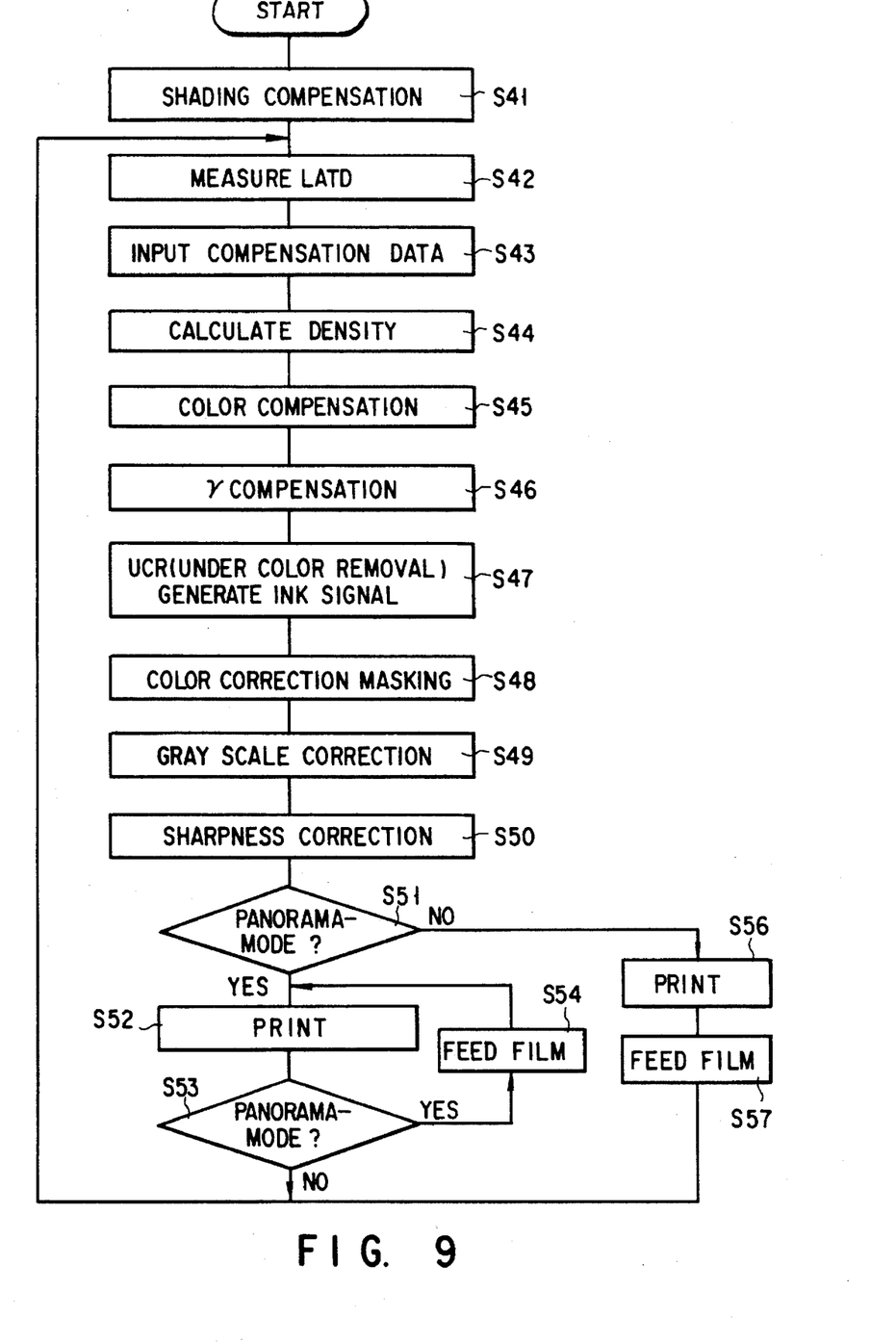
FIG. 9 is a flowchart for explaining the operation of the digital hard copying apparatus in FIG. 8.

The operation of the digital hard copying apparatus in FIG. 8 will be described referring to a flowchart given in FIG. 9.

First, shading compensation is performed (step S41). In this step, deformation originating from a variation in sensor sensitivity and an uneven amount of light from the light source is compensated. Then, the large area transmittance density (LATD) of a printing target frame is measured based on image data detected by the color line sensor 118 (step S42). Next, the print density and R (red), G (green) and B (blue) colors are compensated based on the LATD and the compensation data from the LSI card 140 (steps S43, S44 and S45).

Then, a reflectance-voltage linear signal (BGR) is converted to a density-voltage linear signal (YMC) in a y compensating section (not shown) (step S46), and a gray component in the three-color signal is separated (under color removal: called "UCR") to generate an ink signal (step S47). Next, color correction masking is performed using a predetermined masking equation (step S48).

After gray scale correction is performed (step S49), sharpness correction, such as edge emphasis or smoothing, is performed (step S50). It is then determined if the panorama-mode start bar code has been detected (step S51).

When the printing target frame is determined as a panorama-mode frame, printing is executed based on the aforementioned various types of image processed data (step S52). Thereafter, when the panorama-mode end bar code is detected and the current printing target frame is still a panorama-mode frame (step S53), the film 112 is fed by one frame (step S54). Then, printing is repeated under the same image processing conditions like the same density and the same color balance. If the mode is not determined as the panorama-mode in step S53, the flow returns to step S42 to repeat the above-described operation.

If the mode is not determined as the panorama-mode in the aforementioned step S51, printing is executed (step S56), the film 112 is fed by one frame (step S57) and the flow then returns to step S42 to repeat the above-described operation.

The discrimination on the panorama-mode in step S51 will be carried out as follows. When the frame whose panorama-mode start bar code has been detected by the bar code sensor 134 is fed to the printing position, the mode is determined as the panorama-mode. The discrimination on the panorama-mode in step S53 will be carried out as follows. When a frame immediately before the frame whose panorama-mode end bar code has been detected by the bar code sensor 134 is fed to the printing position, it is determined that the mode is not the panorama-mode or that it is the end of the panorama-mode.

Although the foregoing description of the embodiments has been given with reference to the case where data is optically recorded on a film by means of a liquid crystal, this invention is not limited to this particular type and magnetic recording may be employed instead.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera capable of taking a panoramic photograph, comprising:

a photometer for measuring a brightness of an object to be photographed;

a film sensitivity input device for inputting film sensitivity information of a photographic film;

an exposure control device for controlling an amount of exposure to said film;

a panorama mode switch for selecting a panorama-mode for rolling consecutive frames under a same exposure condition;

an information recording device for recording information on said film; and a microcomputer, connected to said photometer, said film sensitivity input device, said panorama-mode switch and said information recording device, for calculating an exposure control value based on said brightness of said object measured by said photometer and said film sensitivity information input by said film sensitivity input device, controlling said exposure control device based on said exposure control value, and, with said panorama-mode selected by said panorama-mode switch, controlling said exposure control device so as to take consecutive photographs from a point of setting said panorama-mode to a point of releasing said panorama-mode under a same exposure and causing said information recording device to record setting of said panorama-mode on said film, whereby information of said panorama-mode is indicated to an external printing equipment.

2. A camera according to claim 1, wherein when detecting setting or releasing of said panorama-mode based on an operational status of said panorama-mode switch, said microcomputer causes said information recording device to perform recording.

3. A camera according to claim 1, wherein while said panorama-mode is being set by said panorama-mode switch, said microcomputer executes exposure control in such a way as to ensure an amount of exposure based on an exposure control value used for taking a photograph with a first frame set to said panorama-mode.

4. A camera according to claim 1, wherein said information recording device comprises an optical recording device for making optical recording on a part of said film.

5. A camera according to claim 4, wherein said optical recording device records a bar code.

6. A camera according to claim 1, wherein said information recording device comprises a magnetic recording device for making magnetic recording on a magnetic recording medium provided on a part of said film.

7. A camera according to claim 1, further comprising a display device for indicating setting of said panorama-mode.

8. A camera capable of taking a panoramic photograph, comprising:

panorama-mode setting means for setting a panorama-mode;

exposure control means for executing exposure control on consecutive frames of a photographic film with a same amount of exposure in said panorama-mode; and an information recording device for recording setting of said panorama-mode on said photographic film, whereby information of said panorama-mode is indicated to an external printing equipment.

9. A camera according to claim 8, wherein said information recording device comprises an optical recording device for making optical recording on a part of said film.

10. A camera according to claim 9, wherein said optical recording device records a bar code.

11. A camera according to claim 8, wherein said information recording device comprises a magnetic recording device for making magnetic recording on a magnetic recording medium provided on a part of said film.

12. A camera according to claim 8, wherein said information recording apparatus records a start of said panorama-mode set and a release of said panorama-mode.

13. A camera according to claim 8, further comprising a display device for indicating setting of said panorama mode.

14. A camera according to claim 8, wherein while said panorama-mode is being set by said panorama-mode setting means, said exposure control means executes exposure control in such a way as to ensure an amount of exposure based on an exposure control value used for taking a photograph with a first frame set to said panorama-mode.

15. A printing equipment for subjecting a developed film having panoramic information recorded thereon to printing on a photographic paper, comprising:

an exposure device for projecting an object image exposed on said developed film on a photographic paper, with a variable exposure time;

a photometric sensor for measuring a brightness of said projected image of said developed film;

an information reading device for reading panoramic information recorded on a part of said developed film; and a computer for outputting an exposure time control signal to said exposure device after receiving brightness information from said photometric sensor and said panoramic information from said information reading device, calculating an exposure time based on said brightness information, controlling an exposure time of said exposure device to said photographic paper based on said calculated exposure time, and making said exposure time of said exposure device to said photographic paper constant for consecutive frames from a start of a panorama-mode set to a release of said panorama-mode, when recording of panoramic information is detected by said information reading device.

16. A printing equipment according to claim 15, wherein said computer selects a proper one of color adjusting filters based on information from said photometric sensor.

17. A printing equipment according to claim 15, wherein when detecting panorama-mode start information in said panoramic information, by a same exposure time as an exposure time for a photographic paper at a time of that detection, said computer performs an exposure operation on a next photographic paper and repeats said exposure operation until panorama-mode end information is detected.

18. A printing equipment according to claim 15, wherein said panoramic information recorded on said film comprises optically recorded information, and said information recording device comprises an optical recording device.

19. A printing equipment according to claim 15, wherein said panoramic information recorded on said film comprises magnetically recorded information, and said information recording device comprises a magnetic recording device.

20. A printing equipment for providing a hard printout based on a developed film having panoramic information recorded thereon, comprising:

a scanner for converting each image on said developed film to an image signal;

an information reading device for reading said panoramic information recorded on a part of said developed film;

a hard printer for performing printing based on an image control signal; and control means for outputting said image control signal to said hard printer after receiving said image signal from said scanner and said panoramic information from said information reading device, executing image processing based on said image signal of each image on said film to output said image control signal, and executing said image processing under a same condition for consecutive frames from a start of a panorama-mode set to a release of said panorama-mode, when said panoramic information is detected by said information reading device, whereby consecutive frames rolled in panorama-mode are subjected to printing under a same condition.

21. A printing equipment according to claim 20, wherein said panoramic information recorded on said film comprises optically recorded information, and said information recording device comprises an optical recording device.

22. A printing equipment according to claim 20, wherein said panoramic information recorded on said film comprises magnetically recorded information, and said information recording device comprises a magnetic recording device.

23. A printing equipment for printing images recorded on a developed film having panoramic information recorded thereon based on said developed film, comprising:

- printing means for printing said images recorded on said developed film;
- setting means for setting a printing condition for said printing means;
- an information reading device for reading panoramic information recorded on a part of said developed film; and
- control means for causing said printing means to print under a same printing condition for frames that are determined to have been rolled in panorama-mode based on said panoramic information read by said information reading device.

24. A printing equipment according to claim 23, wherein said control means permits said printing means to start printing under said same printing condition when detecting panorama-mode start information in said panoramic information, and permits said printing means to stop printing under said same printing condition when detecting panorama-mode release information in said panoramic information.

25. A printing equipment according to claim 23, wherein said printing means comprises a device for exposing an optical image on a photographic paper.

26. A printing equipment according to claim 23, wherein said printing means comprises a hard printer for printing images on said developed film after converting said images to image signals.

27. A panoramic photograph system for connecting a plurality of frames to obtain a panoramic photograph, comprising:

- a camera including means for performing control in such a way as to ensure a constant amount of exposure for individual frames in a sequence of panoramic photographing operations, and means for recording codes indicating at least first and last frames of consecutive panorama-mode frames; and
- a printing equipment including means for detecting said codes recorded on a developed film; and means for identifying said consecutive panorama-mode frames based on said codes and executing a printing operation for said panoramic photograph in such a way that printing of said consecutive panorama-mode frames is conducted under a same condition.

28. A camera for taking a panoramic photograph, comprising:

- exposure means for exposing a film to record an image of an object thereon;
- indicating means for indicating start and end of a sequence of panoramic photographing operations;
- control means for controlling said exposure means in such a manner as to ensure a same exposure condition for individual frames during said sequence of panoramic photographing operations; and
- recording means for recording information to allow at least first and last frames in said sequence of panoramic photographing operations to be identified, on said film.

29. A camera according to claim 28, wherein said indicating means comprises a manually operable member.

30. A camera according to claim 28, wherein a panorama-mode and a mode other than said panorama-mode are selectively switched from one to another in accordance with an operation of a manually operable member.

31. A camera according to claim 30, further including means for displaying that said panorama-mode is selected.

32. A camera according to claim 30, wherein said recording means optically records said information.

33. A camera according to claim 30, wherein said recording means optically records said information and includes a liquid crystal display element for forming a bar code pattern equivalent to said information and a light source for illuminating said liquid crystal display element.

34. A camera according to claim 30, wherein said recording means records a panorama-mode start code in a vicinity of a first frame in said sequence of panoramic photographing operations and records a panorama-mode end code in a vicinity of a last frame in said sequence of panoramic photographing operations.

35. A printing equipment for producing a panoramic photograph, comprising:

- means for detecting consecutive panorama-mode frames from among a plurality of frames of a developed film by reading identification codes recorded by a recording device of a camera at a time of taking a panoramic photograph and determining first and last panorama-mode frames; and
- means for subjecting said consecutive panorama-mode frames to printing under a same condition.

36. A printing equipment according to claim 35, wherein said printing means performs printing on said consecutive panorama-mode frames with a same color balance and a same amount exposure.

37. A printing equipment according to claim 36, wherein said print means includes means for determining said amount of exposure from a large area transmittance density of said consecutive panorama-mode frames.

38. A printing equipment comprising:

- means for identifying consecutive panorama-mode frames and normal frames from among a plurality of frames of a developed film by checking whether or not an identification code indicating said consecutive panorama-mode frames is recorded at a specific position on said film; and
- means for processing said consecutive panorama-mode frames under a same printing condition and processing said normal frames under respective printing conditions.

* * * * *